US011882461B2

(12) United States Patent
Ryu et al.

(10) Patent No.: US 11,882,461 B2
(45) Date of Patent: Jan. 23, 2024

(54) BIDIRECTIONAL LISTEN-BEFORE-TALK OPERATION

(71) Applicant: QUALCOMM Incorporated, San Diego, CA (US)

(72) Inventors: Jung Ho Ryu, Fort Lee, NJ (US); Junyi Li, Chester, NJ (US); Tao Luo, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/919,730

(22) Filed: Jul. 2, 2020

(65) Prior Publication Data

US 2021/0014699 A1 Jan. 14, 2021

Related U.S. Application Data

(60) Provisional application No. 62/871,531, filed on Jul. 8, 2019.

(51) Int. Cl.
*H04W 16/28* (2009.01)
*H04W 74/08* (2009.01)

(52) U.S. Cl.
CPC ....... *H04W 16/28* (2013.01); *H04W 74/0808* (2013.01)

(58) Field of Classification Search
CPC ... H04W 16/28; H04W 74/0808; H04B 7/088
See application file for complete search history.

(56) References Cited

U.S. PATENT DOCUMENTS

| 10,327,241 | B2 | 6/2019 | Kadous | |
|---|---|---|---|---|
| 2018/0054832 | A1* | 2/2018 | Luo | H04B 17/24 |
| 2018/0242357 | A1* | 8/2018 | Khirallah | H04L 1/1896 |
| 2019/0059106 | A1 | 2/2019 | Zhang et al. | |
| 2019/0200389 | A1* | 6/2019 | Li | H04B 7/0695 |
| 2019/0261366 | A1* | 8/2019 | Ahn | H04W 84/12 |
| 2020/0059962 | A1* | 2/2020 | Tejedor | H04W 74/0808 |
| 2020/0314906 | A1* | 10/2020 | Goyal | H04W 74/0816 |
| 2020/0367314 | A1* | 11/2020 | Belleschi | H04L 27/0006 |

(Continued)

FOREIGN PATENT DOCUMENTS

| CN | 109219152 A | 1/2019 |
|---|---|---|
| WO | 2018085005 A1 | 5/2018 |

(Continued)

OTHER PUBLICATIONS

International Search Report and Written Opinion—PCT/US2020/040798—ISA/EPO—dated Oct. 7, 2020.

*Primary Examiner* — Ivan O Latorre
(74) *Attorney, Agent, or Firm* — Harrity & Harrity, LLP

(57) ABSTRACT

Various aspects of the present disclosure generally relate to wireless communication. In some aspects, a wireless node may perform a listen-before-talk (LBT) operation in a first direction and a second direction, wherein the second direction is opposite to the first direction, and wherein the LBT operation is performed using a first receive beam in the first direction and a second receive beam in the second direction, and selectively performing a transmission in the first direction based at least in part on a result of the LBT operation. Numerous other aspects are provided.

30 Claims, 6 Drawing Sheets

(56) References Cited

U.S. PATENT DOCUMENTS

2021/0058967 A1* 2/2021 Oteri ................. H04W 74/0808
2021/0168862 A1* 6/2021 Murray ............... H04W 74/002
2021/0274550 A1* 9/2021 Zhang ............... H04W 74/0833
2021/0410187 A1* 12/2021 Yang .................... H04W 16/28

FOREIGN PATENT DOCUMENTS

WO    2019079500 A1    4/2019
WO    2019102028 A1    5/2019

* cited by examiner

BIDIRECTIONAL LISTEN-BEFORE-TALK OPERATION

CROSS-REFERENCE TO RELATED APPLICATION

This Patent Application claims priority to U.S. Provisional Patent Application No. 62/871,531, filed on Jul. 8, 2019, entitled "BIDIRECTIONAL LISTEN-BEFORE-TALK OPERATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for a bidirectional listen-before-talk (LBT) operation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a wireless node, may include performing a listen-before-talk (LBT) operation in a first direction and a second direction, wherein the second direction is opposite to the first direction, and wherein the LBT operation is performed using a first receive beam in the first direction and a second receive beam in the second direction; and selectively performing a transmission in the first direction based at least in part on a result of the LBT operation.

In some aspects, a wireless node for wireless communication may include memory and one or more processors operatively coupled to the memory. The memory and the one or more processors may be configured to perform an LBT operation in a first direction and a second direction, wherein the second direction is opposite to the first direction, wherein the LBT operation is performed using a first receive beam in the first direction and a second receive beam in the second direction; and selectively perform a transmission in the first direction based at least in part on a result of the LBT operation.

In some aspects, a non-transitory computer-readable medium may store one or more instructions for wireless communication. The one or more instructions, when executed by one or more processors of a wireless node, may cause the one or more processors to perform an LBT operation in a first direction and a second direction, wherein the second direction is opposite to the first direction, wherein the LBT operation is performed using a first receive beam in the first direction and a second receive beam in the second direction; and selectively perform a transmission in the first direction based at least in part on a result of the LBT operation.

In some aspects, an apparatus for wireless communication may include means for performing an LBT operation in a first direction and a second direction, wherein the second direction is opposite to the first direction, wherein the LBT operation is performed using a first receive beam in the first direction and a second receive beam in the second direction; and means for selectively performing a transmission in the first direction based at least in part on a result of the LBT operation.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
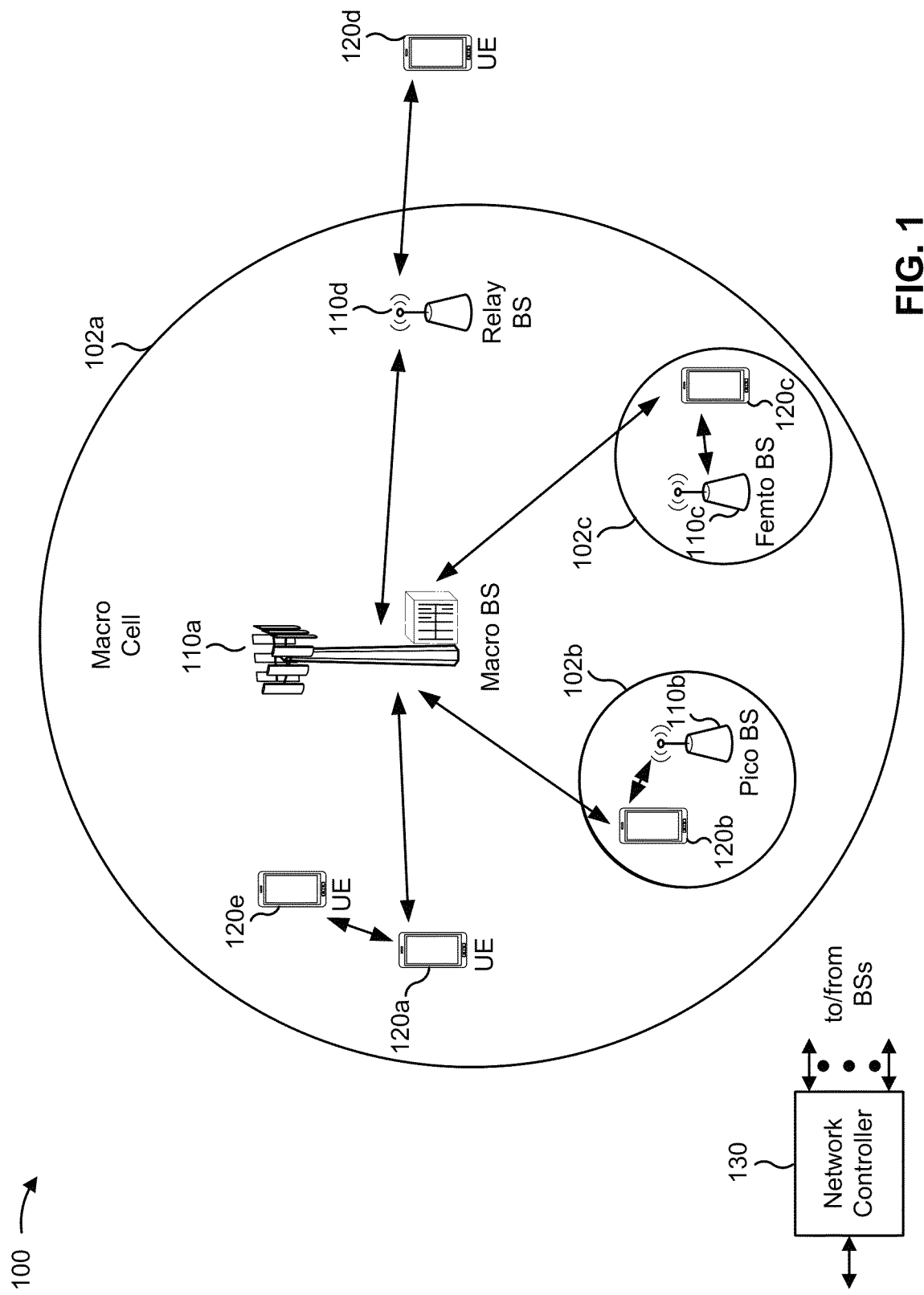
FIG. 1 is a diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
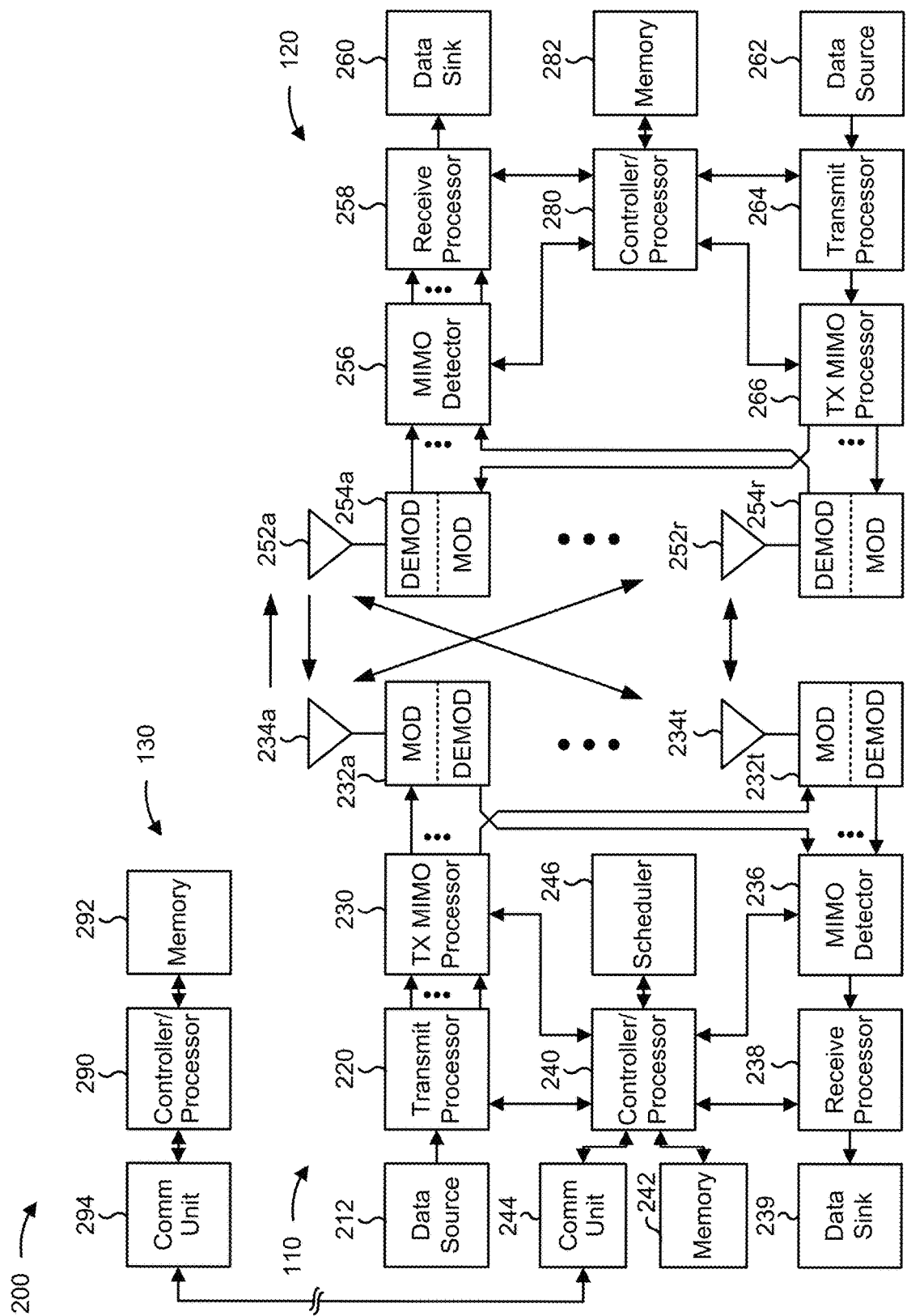
FIG. 2 is a diagram illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with a bidirectional LBT operation, as described in more detail elsewhere herein. For example, controller/processor 240 of base station 110, controller/processor 280 of UE 120, and/or any other component(s) of FIG. 2 may perform or direct operations of, for example, process 500 of FIG. 5 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 500 of FIG. 5 and/or other processes as described herein. A scheduler 246 may schedule UEs for data transmission on the downlink and/or uplink.

In some aspects, a wireless node (e.g., UE 120 or BS 110) may include means for performing a listen-before-talk (LBT) operation in a first direction and a second direction, wherein the second direction is opposite to the first direction, wherein the LBT operation is performed using a first receive beam in the first direction and a second receive beam in the second direction; means for selectively performing a transmission in the first direction based at least in part on a result of the LBT operation; means for performing the LBT operation in the first direction and the second direction contemporaneously; means for performing the LBT operation in the first direction and the second direction sequentially; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like. In some aspects, such means may include one or more components of BS 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Some wireless nodes, such as a wireless node in a non-centrally-scheduled deployment (e.g., an unlicensed spectrum deployment, a sidelink network, and/or the like) may perform a listen-before-talk (LBT) operation to determine whether a channel has sufficient available resources to perform a communication. LBT may be an abbreviation of listen-before-talk or listen-before-transmit. Listen-before-talk is used interchangeably with listen-before-transmit herein. In an LBT operation, a wireless node may listen to a desired frequency resource for a period of time. If the desired resource is not reserved by another wireless node in that time, or if interference and noise on the desired resource do not satisfy a threshold (e.g., if there is not too much interference or noise on the desired resource), then the wireless node may reserve the resource and perform a communication on the resource.

A wireless node may improve transmission or reception performance by performing beamforming. For example, a transmitting device may generate a transmit beam directed to a receiving device, and the receiving device may generate a receive beam directed to a cluster associated with the transmit beam. Beamforming may improve gain relative to a widebeam or omni-directional transmission approach.

A directional LBT operation is an LBT operation in which a wireless node uses a receive beam, directed to a target wireless node, to determine whether channel conditions are acceptable for a transmission to the target wireless node. For example, if a wireless node A desires to perform a transmission to a wireless node D in direction X, the wireless node A may generate a receive beam in direction X, and may perform an LBT operation using the receive beam. If the LBT operation is successful (e.g., if the node A does not sense any active transmission by another node), the wireless node A may use a transmit beam to perform the transmission to the wireless node D.

However, a successful LBT operation in direction X may not guarantee an unoccupied channel for the transmission from the wireless node A to the wireless node D. For example, if another wireless node C is located in the −X direction (the direction opposite from direction X) from the wireless node A, and if the wireless node C directs a communication to the wireless node B in the X direction, the wireless node A may not detect the communication, because wireless node A's receive beam is directed to direction X and hence cannot receive any transmissions in other directions and in particular in direction X, and due to blockage of the wireless node C's signal by components of the wireless node A. For example, if the beam in direction X is directed outward from the back of a UE, then the glass or screen would block signals from the negative X direction. This may cause interference or collision between the wireless node A and the wireless node C.

Some techniques and apparatuses described herein provide a bi-directional LBT operation for a wireless node to determine whether a channel is clear for a transmission to another wireless node. For example, continuing to use the notation from the above example, the wireless node A may perform the LBT operation in the X direction and the −X direction (e.g., using respective receive beams). Thus, the wireless node A may determine whether the channel is clear with respect to the wireless node B and with respect to the wireless node C. This improves the efficacy of the LBT operation and reduces the likelihood of interference from wireless node C (or any wireless node located opposite from the wireless node A's LBT operation target).

Figure 3:
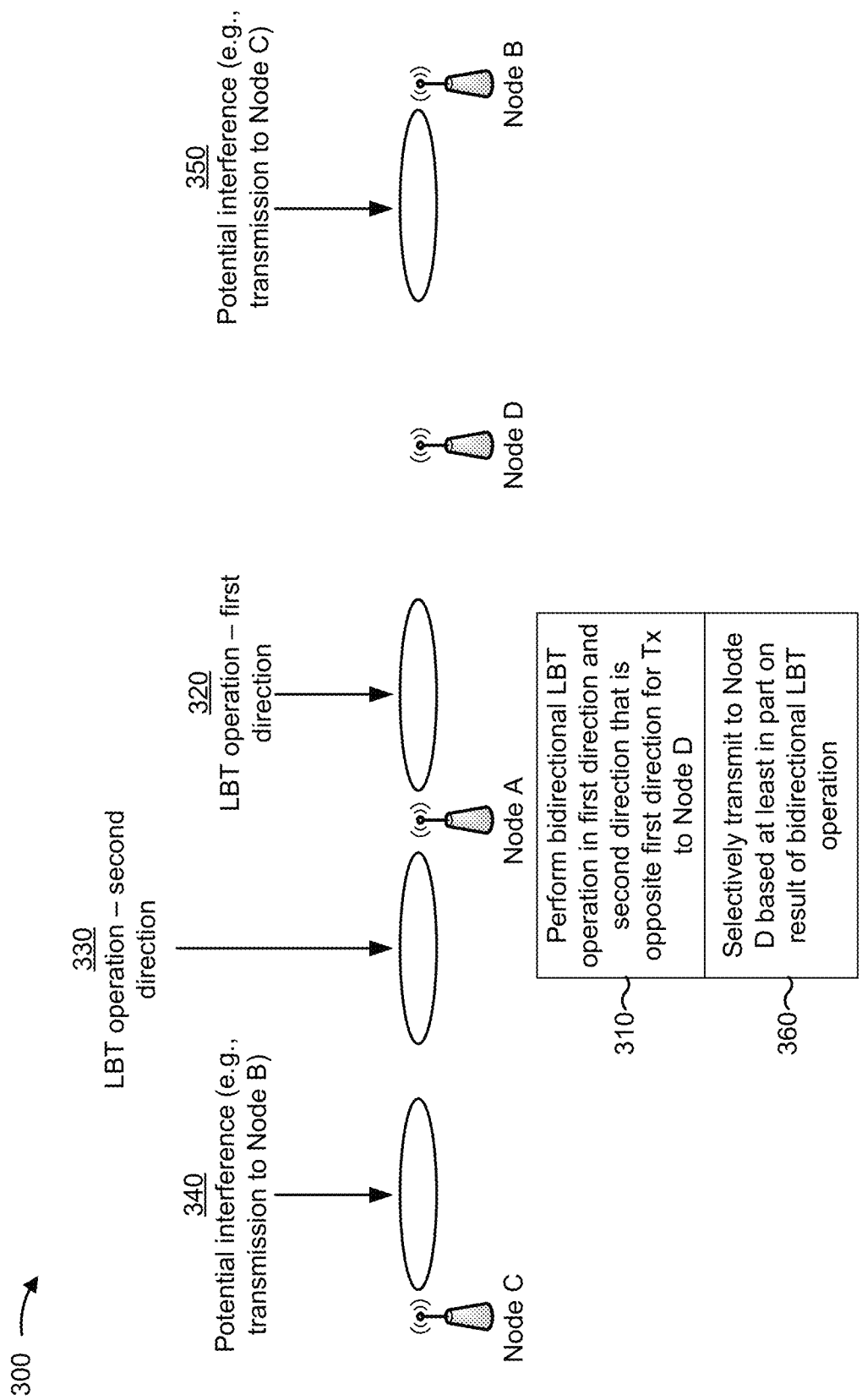
FIG. 3 is a diagram illustrating an example of a procedure for a bidirectional LBT operation, in accordance with various aspects of the present disclosure.

FIG. 3 is a diagram illustrating an example 300 of a procedure for a bidirectional LBT operation, in accordance with various aspects of the present disclosure. As shown, FIG. 3 depicts a Node A, a Node B, a Node C, and a Node D. The nodes A, B, C and D may be wireless nodes (e.g., UE 120 or BS 110).

As shown in FIG. 3, and by reference number 310, the Node A may perform a bidirectional LBT operation in a first direction and a second direction. For example, the Node A may perform the bidirectional LBT operation to determine whether a transmission in the direction towards the Node D can be performed. The LBT operation in the first direction is shown by reference number 320, and the LBT operation in the second direction is shown by reference number 330. The first direction and the second direction may be opposite from each other. For example, if the first direction is the X direction, the second direction may be the −X direction (e.g., diametrically opposed from the first direction). In some aspects, the Node A may determine that an LBT operation is to be performed for the Node D, and may perform the bidirectional LBT operation based at least in part on determining that the LBT operation is to be performed for the Node D. The LBT operation referred to herein may be an LBT listen operation, such as a Category 2 LBT operation, a Category 4 LBT operation, and/or the like.

The Node A may perform the bidirectional LBT operation to detect potential interference from the Node C (shown by reference number 340) and to detect potential interference from the Node B (shown by reference number 350). As shown in FIG. 3, Node C is transmitting to Node B, and thus Node B cannot cause interference to Node A's transmission. However, if Node B was transmitting to Node C (e.g., the opposite of what is depicted in FIG. 3), then Node B can cause interference to Node A's transmission, so it may be beneficial to perform LBT operation in direction X. In other words, Node A may not know which node is transmitting to which node, so bidirectional LBT may be beneficial. For example, the Node C's transmission to Node B will cause interference to Node A's target node (Node D) because Node C's direction of transmission is the same as Node A's direction of transmission, though the interference may be caused by other factors in addition to or as an alternative to these transmissions. The interference from the Node B and/or the Node C may be caused by omni-directional transmissions, pseudo-omni-directional transmissions, beamformed transmissions, or a combination thereof.

As shown by reference number 360, the Node A may selectively transmit to the Node D based at least in part on a result of the bidirectional LBT operation. For example, if the bidirectional LBT operation indicates that the channel is available with regard to the Node B and the Node C (i.e., in beam formed directions X and −X), then the Node A may transmit to the Node D by generating a transmit beam directed to the Node D. If the bidirectional LBT operation indicates that the channel is not available with regard to at least one of the Node B or the Node C (i.e., in beam formed directions X and −X), then the Node A may not transmit to the Node D (e.g., may perform a later LBT operation to identify a subsequent transmit opportunity). In some aspects, the Node A may configure a parameter of a transmission to the Node D based at least in part on the result of the bidirectional LBT operation. For example, if the channel is available but with some level of interference from the Node B or the Node C (i.e., in beam formed directions X or −X), the Node A may configure the transmission to the Node D such that a signal of the transmission overcomes the level interference from the Node B or the Node C.

In this way, the Node A may perform a bidirectional LBT operation, which may identify interference generated by a wireless node in the direction of the target wireless node or by a node in the opposite direction from the target wireless node. This reduces interference in sidelink deployments and improves radio performance of the Node A.

As indicated above, FIG. 3 is provided as an example. Other examples may differ from what is described with respect to FIG. 3.

Figure 4:
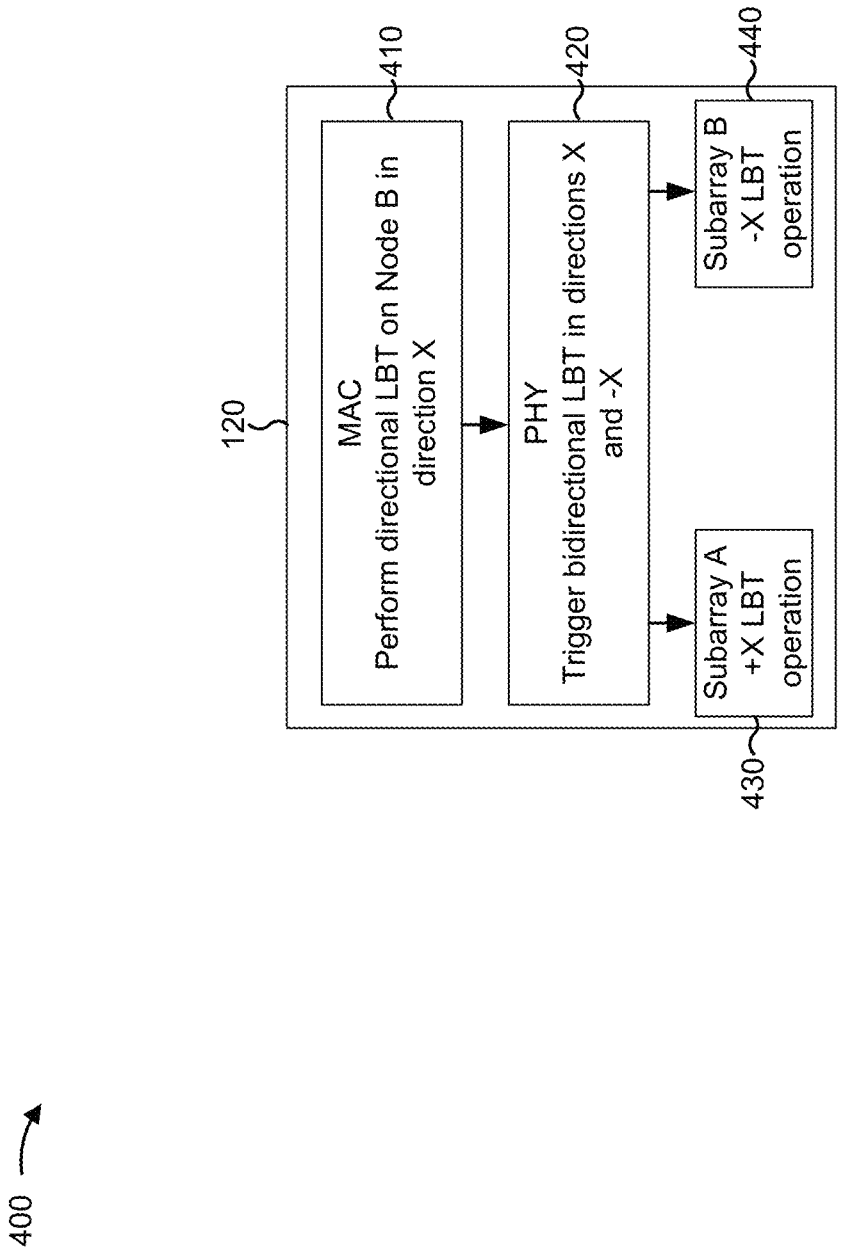
FIG. 4 is a diagram illustrating an example of intra-UE signaling for a bidirectional LBT operation, in accordance with various aspects of the present disclosure.

FIG. 4 is a diagram illustrating an example 400 of intra-UE signaling for a bidirectional LBT operation, in accordance with various aspects of the present disclosure. The operations described in connection with FIG. 4 are shown as being performed by a UE 120, though these operations may be performed by any wireless node, such as another wireless node described herein. Furthermore, while the operations described in connection with FIG. 4 are described as being performed by particular protocol layers, such as the media access control layer and the physical layer, these operations may be performed by any layer of the UE 120.

As shown by reference number 410, a media access control (MAC) layer of the UE 120 may determine that a directional LBT operation is to be performed on the Node D (continuing the notation from FIG. 3) in a direction X. For example, the MAC layer may determine that the UE 120 is to perform a transmission to the Node D, and/or the like. Accordingly, the MAC layer may provide an indication to a physical (PHY) layer of the UE 120 that the UE 120 is to perform the directional LBT operation.

As shown by reference number 420, the PHY layer may trigger (e.g., perform) a bidirectional LBT in the X and −X directions. For example, the PHY layer may trigger the bidirectional LBT operation based at least in part on the indication from the MAC layer to perform the directional LBT operation. Thus, the PHY layer may perform a bidirectional LBT operation based at least in part on an indication to perform a non-bidirectional LBT operation. In some aspects, the MAC layer may provide an indication that the bidirectional LBT operation is to be performed.

As shown by reference number 430, a first antenna subarray of the UE 120 (shown as Subarray A) may form a first set of beams (e.g., one or more receive beams) for the bidirectional LBT operation. As shown by reference number 440, a second antenna subarray of the UE 120 (shown as Subarray B) may form a second set of beams (e.g., one or more receive beams) for the bidirectional LBT operation. For example, the first set of beams may be directed in the X direction and the second set of beams may be directed in the −X direction. In some aspects, Subarray A and Subarray B may be located on opposite sides of the UE 120, or may be capable of directing beams in opposite directions. Subarray A and Subarray B may be part of the same antenna module or different antenna modules.

In some aspects, the UE 120 may perform the LBT operations shown by reference numbers 430 and 440 contemporaneously (e.g., at a same time, at substantially a same time, simultaneously, and/or the like). For example, if the UE 120 is capable of performing multiple contemporaneous LBT operations, then the UE 120 may perform the two LBT operations contemporaneously, which may reduce delay associated with the LBT operations. In some aspects, the UE 120 may perform the LBT operations shown by reference numbers 430 and 440 sequentially. For example, if the UE 120 is not capable of or configured to perform multiple contemporaneous LBT operations, or if the UE 120 determines that the multiple LBT operations are not to be performed contemporaneously, the UE 120 may perform the LBT operations sequentially. This may be less resource-intensive than contemporaneous LBT operation performance.

A beam that is referred to herein as being directed in a direction should be understood to be directed substantially in the direction (e.g., some deviation from the direction is contemplated).

As indicated above, FIG. 4 is provided as an example. Other examples may differ from what is described with respect to FIG. 4.

Figure 5:
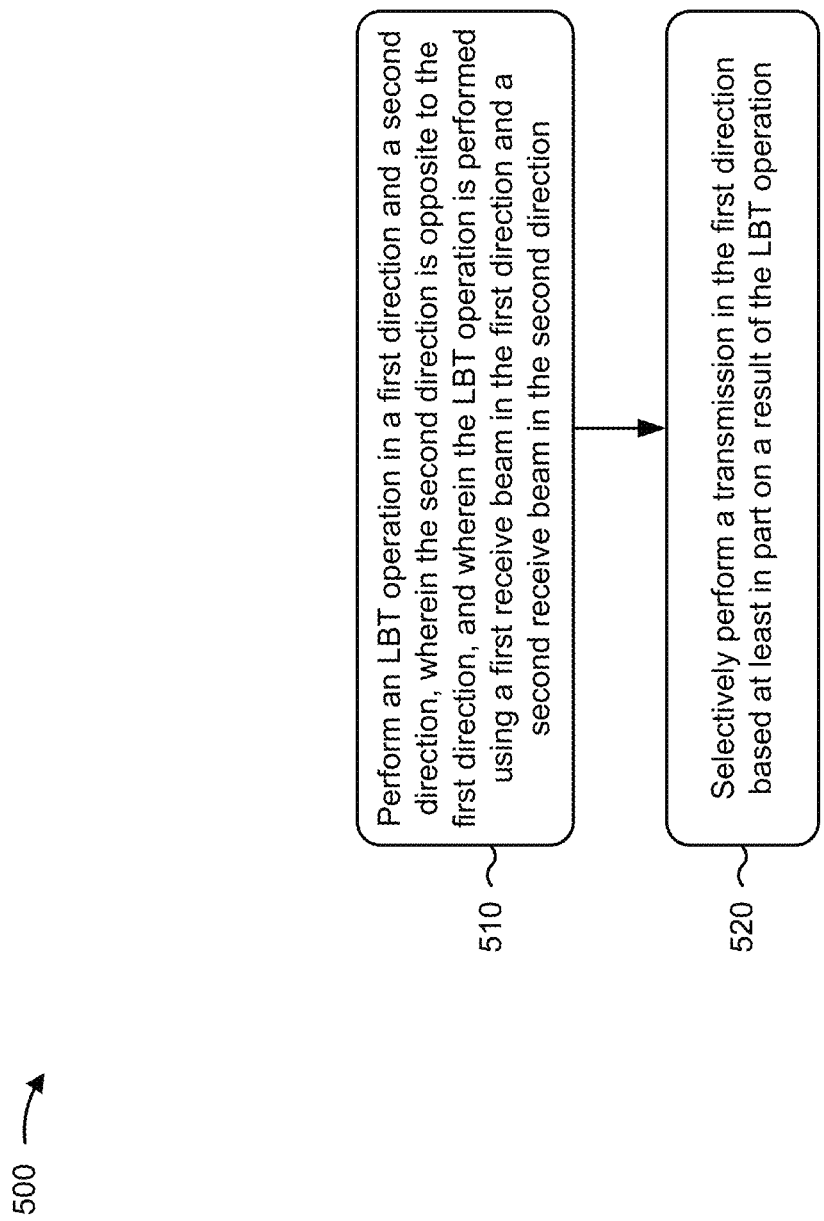
FIG. 5 is a diagram illustrating an example process performed, for example, by a wireless node, in accordance with various aspects of the present disclosure.

FIG. 5 is a diagram illustrating an example process 500 performed, for example, by a wireless node, in accordance with various aspects of the present disclosure. Example process 500 is an example where a wireless node (e.g., BS 110, UE 120, Node A, Node B, Node C, and/or the like) performs operations associated with a bidirectional LBT operation.

As shown in FIG. 5, in some aspects, process 500 may include performing an LBT operation in a first direction and a second direction, wherein the second direction is opposite to the first direction, and wherein the LBT operation is performed using a first receive beam in the first direction and a second receive beam in the second direction (block 510). For example, the wireless node (e.g., using antenna 234, DEMOD 232, MIMO detector 236, receive processor 238, controller/processor 240, antenna 252, DEMOD 254, MIMO detector 256, receive processor 258, controller/processor 280, and/or the like) may perform an LBT operation (e.g., a bidirectional LBT operation) in a first direction and a second direction, as described above. In some aspects, the second direction is opposite to the first direction. In some aspects, the LBT operation is performed using a first receive beam in the first direction and a second receive beam in the second direction.

As further shown in FIG. 5, in some aspects, process 500 may include selectively performing a transmission in the first direction based at least in part on a result of the LBT operation (block 520). For example, the wireless node (e.g., using controller/processor 240, transmit processor 220, TX MIMO processor 230, MOD 232, antenna 234, controller/processor 280, transmit processor 264, TX MIMO processor 266, MOD 254, antenna 252, and/or the like) may selectively perform a transmission in the first direction based at least in part on a result of the LBT operation, as described above.

Process 500 may include additional aspects, such as any single aspect or any combination of aspects described below and/or in connection with one or more other processes described elsewhere herein.

In a first aspect, the LBT operation is performed using at least one of a plurality of beams, including the first receive beam, in the first direction, or a plurality of beams, including the second receive beam, in the second direction.

In a second aspect, alone or in combination with the first aspect, when the LBT operation results in detection of a threshold level of interference in either of the first direction or the second direction, the transmission is not performed.

In a third aspect, alone or in combination with one or more of the first and second aspects, the LBT operation comprises an LBT listen operation.

In a fourth aspect, alone or in combination with one or more of the first through third aspects, performing the LBT operation in the first direction and the second direction is based at least in part on an indication from a media access control layer of the wireless node to a physical layer of the wireless node. In some aspects, the physical layer of the wireless node configures the LBT operation in the first direction and in the second direction.

In a fifth aspect, alone or in combination with one or more of the first through fourth aspects, performing the LBT operation further comprises performing the LBT operation in the first direction and the second direction contemporaneously.

In a sixth aspect, alone or in combination with one or more of the first through fifth aspects, the LBT operation is performed using different subarrays of the wireless node.

In a seventh aspect, alone or in combination with one or more of the first through sixth aspects, performing the LBT operation further comprises performing the LBT operation in the first direction and the second direction sequentially.

In an eighth aspect, alone or in combination with one or more of the first through seventh aspects, the transmission is a sidelink transmission.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
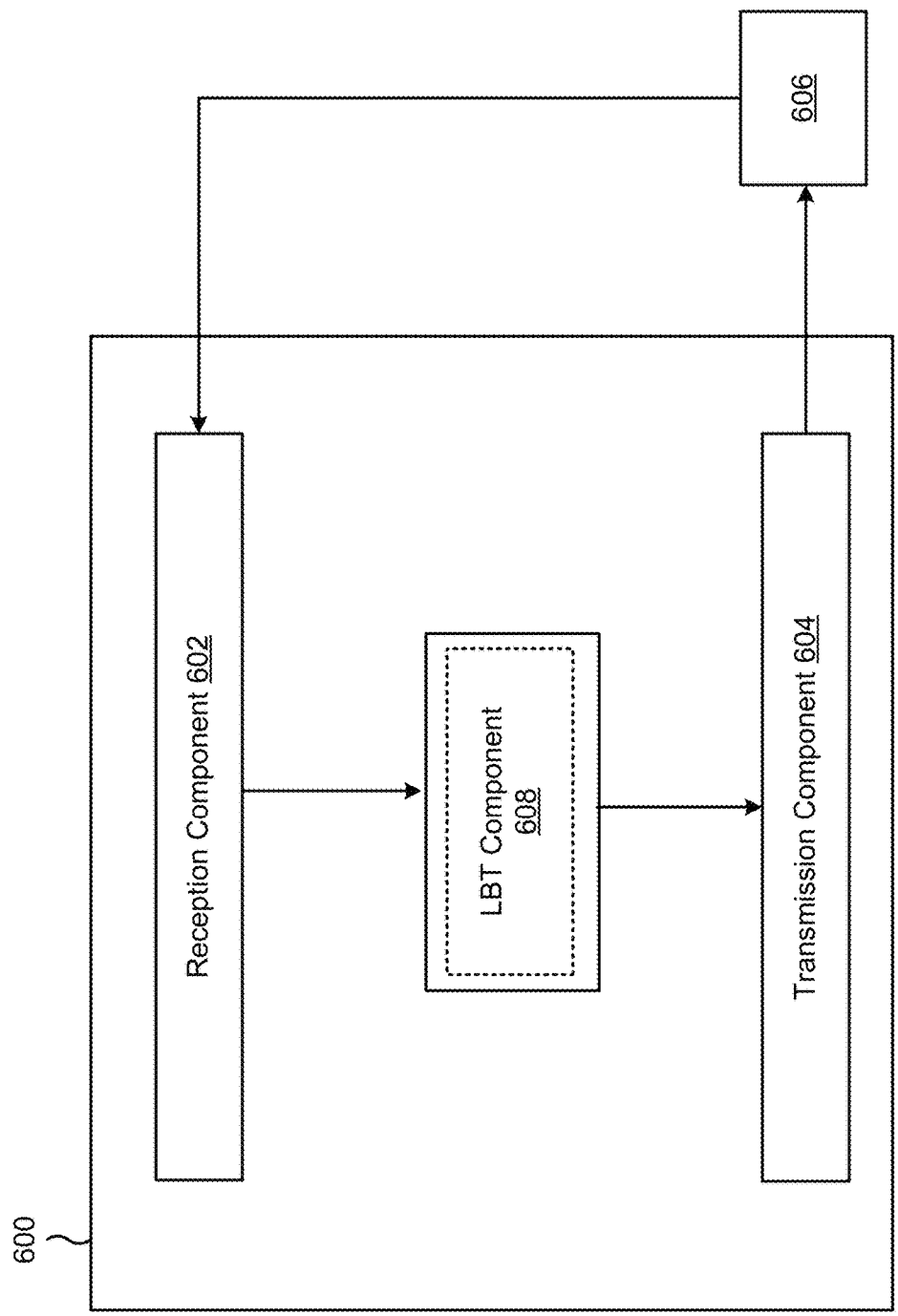
FIG. 6 is a block diagram of an example apparatus 600 for wireless communication.

FIG. 6 is a block diagram of an example apparatus 600 for wireless communication. The apparatus 600 may be a wireless node, or a wireless node may include the apparatus 600. In some aspects, the apparatus 600 includes a reception component 602 and a transmission component 604, which may be in communication with one another (for example, via one or more buses and/or one or more other components). As shown, the apparatus 600 may communicate with another apparatus 606 (such as a UE, a base station, or another wireless communication device) using the reception component 602 and the transmission component 604. As further shown, the apparatus 600 may include an LBT component 608.

In some aspects, the apparatus 600 may be configured to perform one or more operations described herein in connection with FIGS. 3-5. Additionally or alternatively, the apparatus 600 may be configured to perform one or more processes described herein, such as process 500 of FIG. 5. In some aspects, the apparatus 600 and/or one or more components shown in FIG. 6 may include one or more components of the wireless node described above in connection with FIG. 2. Additionally, or alternatively, one or more components shown in FIG. 6 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 602 may receive communications, such as reference signals, control information, data communications, or a combination thereof, from the apparatus 606. The reception component 602 may provide received communications to one or more other components of the apparatus 600. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 606. In some aspects, the reception component 602 may include one or more antennas, a demodulator, a MIMO detector, a receive processor, a controller/processor, a memory, or a combination thereof, of the wireless node described above in connection with FIG. 2.

The transmission component 604 may transmit communications, such as reference signals, control information, data communications, or a combination thereof, to the apparatus 606. In some aspects, one or more other components of the apparatus 606 may generate communications and may provide the generated communications to the transmission component 604 for transmission to the apparatus 606. In some aspects, the transmission component 604 may perform signal processing on the generated communications (such as filtering, amplification, modulation, digital-to-analog conversion, multiplexing, interleaving, mapping, or encoding, among other examples), and may transmit the processed signals to the apparatus 606. In some aspects, the transmission component 604 may include one or more antennas, a modulator, a transmit MIMO processor, a transmit processor, a controller/processor, a memory, or a combination thereof, of the wireless node described above in connection with FIG. 2. In some aspects, the transmission component 604 may be co-located with the reception component 602 in a transceiver.

The LBT component 608 (e.g., using the reception component 602 and/or the transmission component 604) may perform a listen-before-talk (LBT) operation in a first direction and a second direction, wherein the second direction is opposite to the first direction. In some aspects, the LBT component 608 may perform the LBT operation in the first direction and the second direction contemporaneously. In some aspects, the LBT component 608 may perform the LBT operation in the first direction and the second direction sequentially. The transmission component 604 may selectively perform a transmission in the first direction based at least in part on a result of the LBT operation.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally or alternatively, a set of (one or more) components shown in FIG. 6 may perform one or more functions described as being performed by another set of components shown in FIG. 6.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a wireless node, comprising:
   performing a listen-before-talk (LBT) operation in a first direction and a second direction,
      wherein the wireless node is a first node,
      wherein the second direction is opposite to the first direction,
      wherein the LBT operation is performed using a first receive beam, formed by a first antenna subarray of the wireless node, in the first direction and a second receive beam, formed by a second antenna subarray of the wireless node, in the second direction, and
      wherein performing the LBT operation in the first direction and the second direction is based at least in part on an indication, from a media access control layer of the wireless node, to perform the LBT operation; and
   configuring a parameter of a transmission to a third node based at least in part on a result of the LBT operation,
      wherein the result of the LBT operation indicates a level of interference from a second node that is located in the first direction, and wherein the third node is located between the first node and the second node.

2. The method of claim 1, wherein the LBT operation is performed using at least one of:
a plurality of beams, including the first receive beam, in the first direction, or
a plurality of beams, including the second receive beam, in the second direction.

3. The method of claim 1, wherein the LBT operation comprises an LBT listen operation.

4. The method of claim 1, wherein the indication to perform the LBT operation is provided to a physical layer of the wireless node, and wherein the physical layer of the wireless node configures the LBT operation in the first direction and in the second direction based on the indication to perform the LBT operation.

5. The method of claim 1, wherein performing the LBT operation further comprises:
performing the LBT operation in the first direction and the second direction contemporaneously.

6. The method of claim 1, wherein performing the LBT operation further comprises:
performing the LBT operation in the first direction and the second direction sequentially.

7. The method of claim 1, wherein the transmission is a sidelink transmission.

8. A wireless node for wireless communication, comprising:
one or more memories; and
one or more processors coupled to the one or more memories, the one or more processors configured to:
perform a listen-before-talk (LBT) operation in a first direction and a second direction, wherein the second direction is opposite to the first direction,
wherein the wireless node is a first node,
wherein the LBT operation is performed using a first receive beam, formed by a first antenna subarray of the wireless node, in the first direction and a second receive beam, formed by a second antenna subarray of the wireless node, in the second direction,
and
wherein performing the LBT operation in the first direction and the second direction is based at least in part on an indication, from a media access control layer of the wireless node, to perform the LBT operation; and
configure a parameter of a transmission to a third node based at least in part on a result of the LBT operation, wherein the result of the LBT operation indicates a level of interference from a second node that is located in the first direction, and
wherein the third node is located between the first node and the second node.

9. The wireless node of claim 8, wherein the LBT operation is performed using at least one of:
a plurality of beams, including the first receive beam, in the first direction, or
a plurality of beams, including the second receive beam, in the second direction.

10. The wireless node of claim 8, wherein the LBT operation comprises an LBT listen operation.

11. The wireless node of claim 8, wherein the indication to perform the LBT operation is provided to a physical layer of the wireless node, and wherein the physical layer of the wireless node configures the LBT operation in the first direction and in the second direction based on the indication to perform the LBT operation.

12. The wireless node of claim 8, wherein the one or more processors, when performing the LBT operation, are further configured to:
perform the LBT operation in the first direction and the second direction contemporaneously.

13. The wireless node of claim 8, wherein the one or more processors, when performing the LBT operation, are further configured to:
perform the LBT operation in the first direction and the second direction sequentially.

14. The wireless node of claim 8, wherein the transmission is a sidelink transmission.

15. The wireless node of claim 8,
wherein the result of the LBT operation further indicates:
potential interference from a fourth node that is located in the second direction.

16. The wireless node of claim 8,
wherein the result of the LBT operation further indicates that a channel is available with regard to the second node.

17. The wireless node of claim 8,
wherein, when the parameter of the transmission is configured, a signal of the transmission overcomes the level of interference from the second node.

18. The wireless node of claim 4, wherein the level of interference is caused by omni-directional transmissions, pseudo-omni-directional transmissions, or beamformed transmissions.

19. The wireless node of claim 8,
wherein the one or more processors are further configured to:
determine that the LBT operation is to be performed for the third node, and
wherein the one or more processors, when performing the LBT operation, are further configured to:
perform the LBT operation in the first direction and the second direction based at least in part on determining that the LBT operation is to be performed for the third node.

20. The wireless node of claim 8, wherein the result of the LBT operation further indicates that a channel is available with regard to a fourth node that is located in the second direction.

21. The wireless node of claim 8, wherein the first antenna subarray and the second antenna subarray are located on opposite sides of the wireless node.

22. A non-transitory computer-readable medium storing one or more instructions for wireless communication, the one or more instructions comprising:
one or more instructions that, when executed by one or more processors of a wireless node, cause the one or more processors to:
perform a listen-before-talk (LBT) operation in a first direction and a second direction, wherein the second direction is opposite to the first direction,
wherein the wireless node is a first node,
wherein the LBT operation is performed using a first receive beam, formed by a first antenna subarray of the wireless node, in the first direction and a second receive beam, formed by a second antenna subarray of the wireless node, in the second direction,
and
wherein performing the LBT operation in the first direction and the second direction is based at least in part on an indication, from a media access control layer of the wireless node, to perform the LBT operation; and configure a parameter of a transmission to a third node based at least in part on a result of the LBT operation, wherein the result of the LBT operation indicates a level of interference from a second node that is located in the first direction, and wherein the third node is located between the first node and the second node.

23. The non-transitory computer-readable medium of claim 22, wherein the LBT operation is performed using at least one of:
    a plurality of beams, including the first receive beam, in the first direction, or
    a plurality of beams, including the second receive beam, in the second direction.

24. The non-transitory computer-readable medium of claim 22, wherein the LBT operation comprises an LBT listen operation.

25. The non-transitory computer-readable medium of claim 22, wherein the indication to perform the LBT operation is provided to a physical layer of the wireless node, and wherein the physical layer of the wireless node configures the LBT operation in the first direction and in the second direction based on the indication to perform the LBT operation.

26. The non-transitory computer-readable medium of claim 22, wherein the one or more instructions, that cause the one or more processors to perform the LBT operation, further cause the one or more processors to:
    perform the LBT operation in the first direction and the second direction contemporaneously.

27. The non-transitory computer-readable medium of claim 22, wherein the one or more instructions, that cause the one or more processors to perform the LBT operation, further cause the one or more processors to:
    perform the LBT operation in the first direction and the second direction sequentially.

28. The non-transitory computer-readable medium of claim 22, wherein the transmission is a sidelink transmission.

29. An apparatus for wireless communication, comprising:
    means for performing a listen-before-talk (LBT) operation in a first direction and a second direction, wherein the second direction is opposite to the first direction,
        wherein the apparatus is a first apparatus,
        wherein the LBT operation is performed using a first receive beam, formed by a first antenna subarray of the apparatus, in the first direction and a second receive beam, formed by a second antenna subarray of the apparatus, in the second direction, and
        wherein performing the LBT operation in the first direction and the second direction is based at least in part on an indication, from a media access control layer, to perform the LBT operation; and
    means for configuring a parameter of a transmission to a third apparatus based at least in part on a result of the LBT operation,
        wherein the result of the LBT operation indicates a level of interference from a second apparatus that is located in the first direction, and
        wherein the third apparatus is located between the first apparatus and the second apparatus.

30. The apparatus of claim 29, wherein the LBT operation is performed using at least one of:
    a plurality of beams, including the first receive beam, in the first direction, or
    a plurality of beams, including the second receive beam, in the second direction.

* * * * *